United States Patent [19]
Meester et al.

[11] Patent Number: 5,813,910
[45] Date of Patent: Sep. 29, 1998

[54] ADJUSTABLE FOUR-WEIGHT SHAKER HEAD

[75] Inventors: David Jeffrey Meester, Fresno; Franklin Paul Orlando, Morgan Hill, both of Calif.

[73] Assignee: FMC Corporation, Chicago, Ill.

[21] Appl. No.: 870,146

[22] Filed: Jun. 5, 1997

Related U.S. Application Data

[62] Division of Ser. No. 539,918, Oct. 6, 1995, Pat. No. 5,685,773.

[51] Int. Cl.$^6$ .................................................. A01D 46/00
[52] U.S. Cl. ........................... 460/113; 460/133; 460/145; 56/328.1; 56/340.1
[58] Field of Search ................................. 460/149, 138, 460/113, 126, 133, 144, 145, 146, 147, 148, 150; 56/327.1, 328.1, 340.1

[56] References Cited

U.S. PATENT DOCUMENTS

| | | | |
|---|---|---|---|
| 3,413,789 | 12/1968 | Studer | 56/330 |
| 4,286,426 | 9/1981 | Orlando | 56/330 |
| 4,982,558 | 1/1991 | Korthuis | 56/12.6 |
| 5,197,269 | 3/1993 | Meester | 56/327.1 |
| 5,316,519 | 5/1994 | Johnson | 460/96 |

*Primary Examiner*—Terry Lee Melius
*Attorney, Agent, or Firm*—Speckman Pauley Petersen & Fejer

[57] ABSTRACT

The invention provides a shaker with a set of primary eccentric weights and secondary eccentric weights. The invention rotates the primary and secondary eccentric weights at the same speed, but may on the fly change the rotational phase between the primary and secondary eccentric weights, causing an on the fly change of amplitude of the inventive shaker.

19 Claims, 11 Drawing Sheets

FIG_1
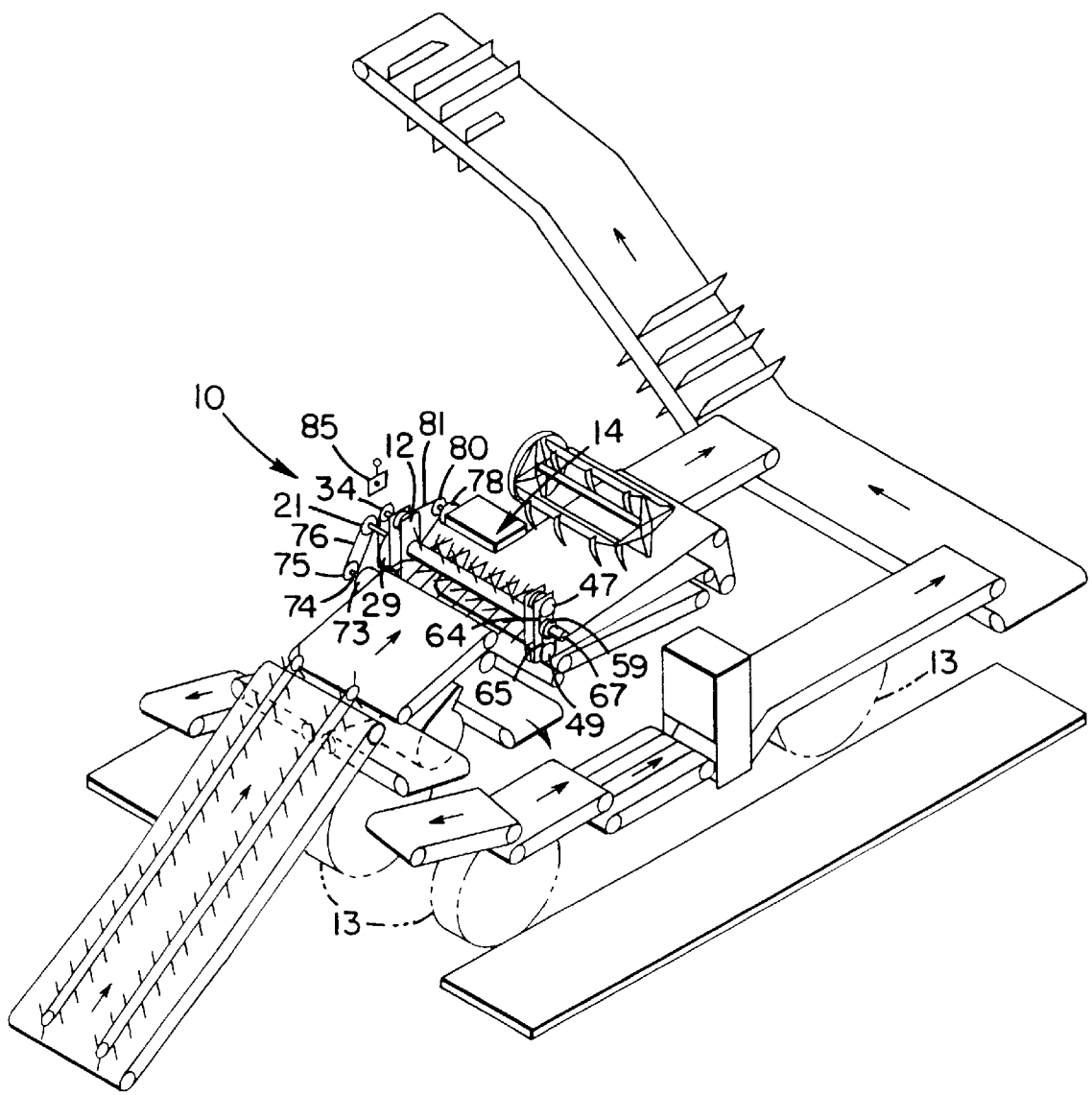

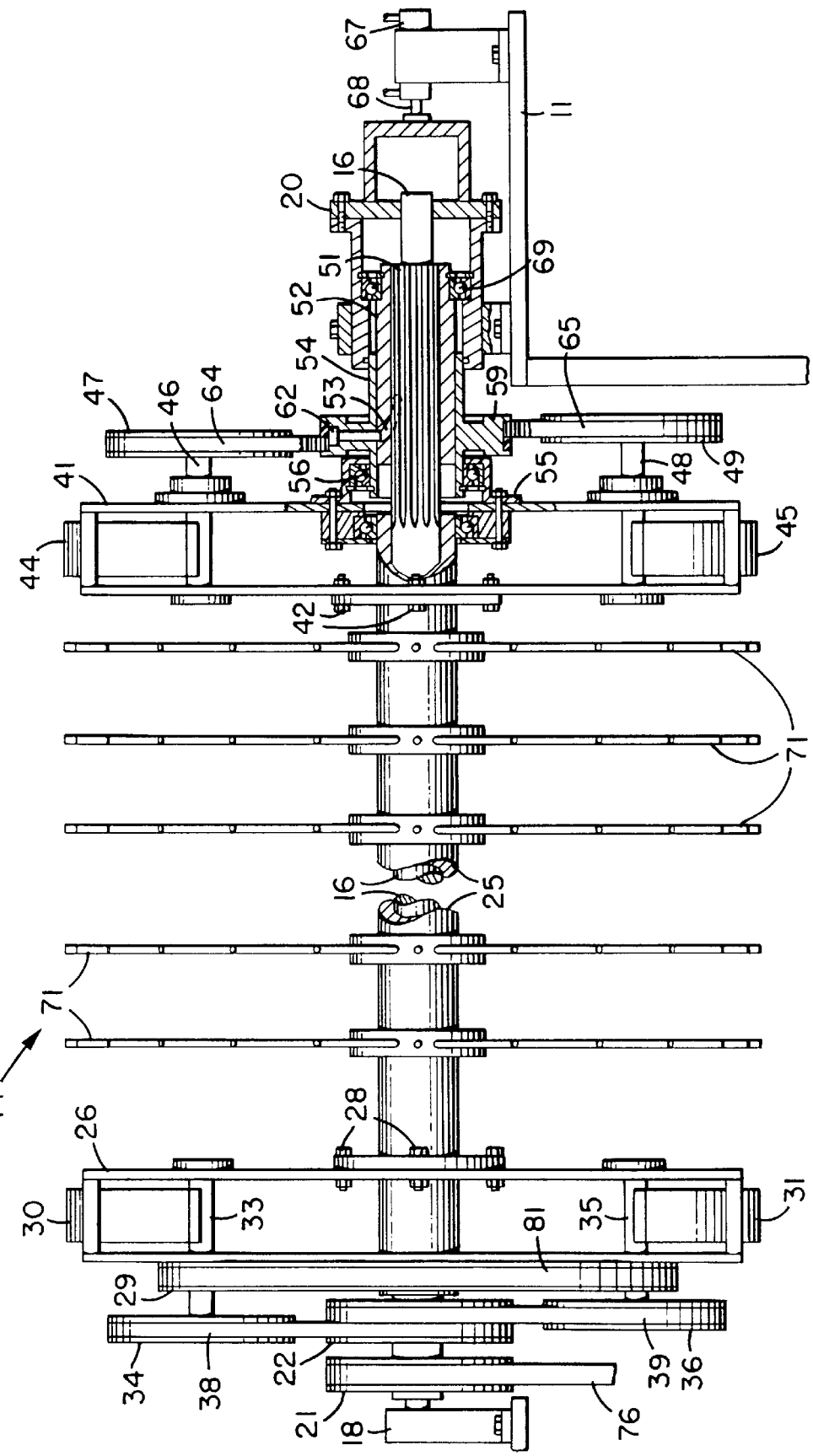
FIG_2

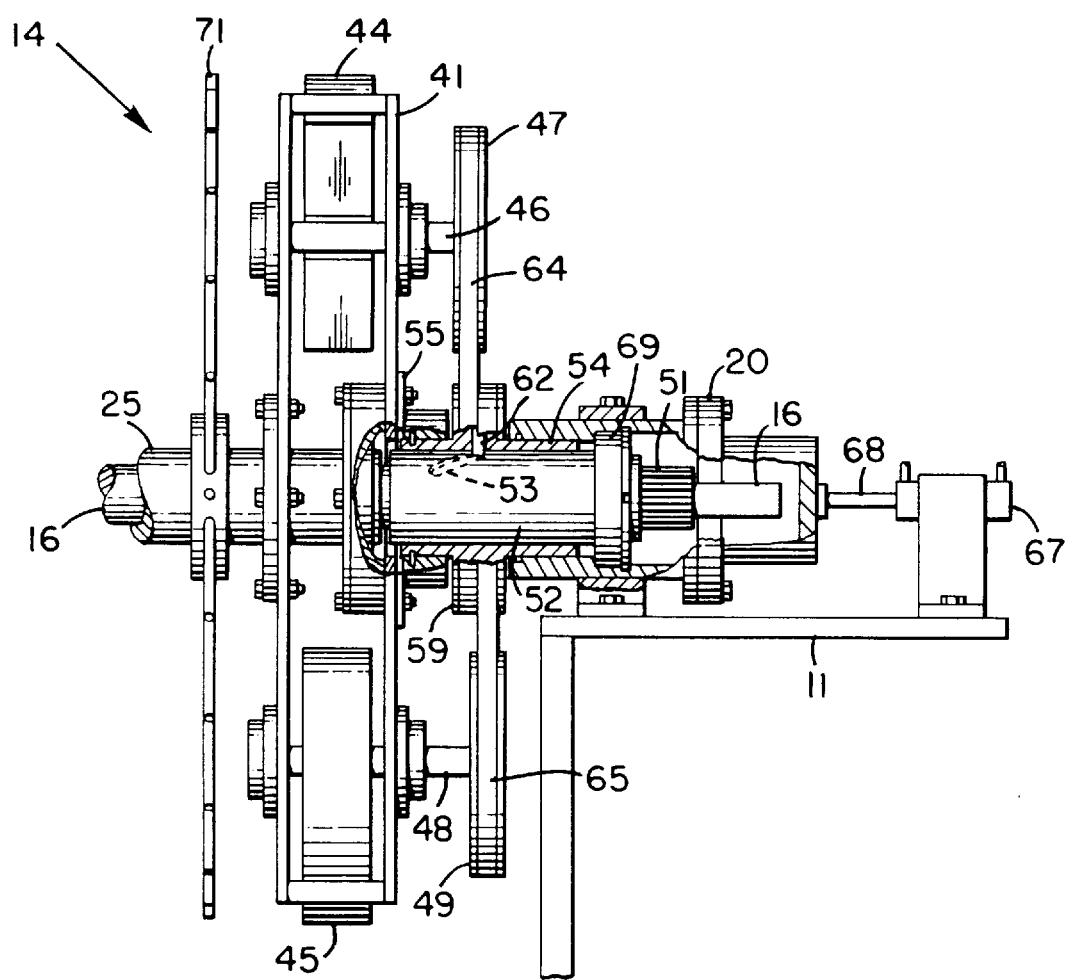

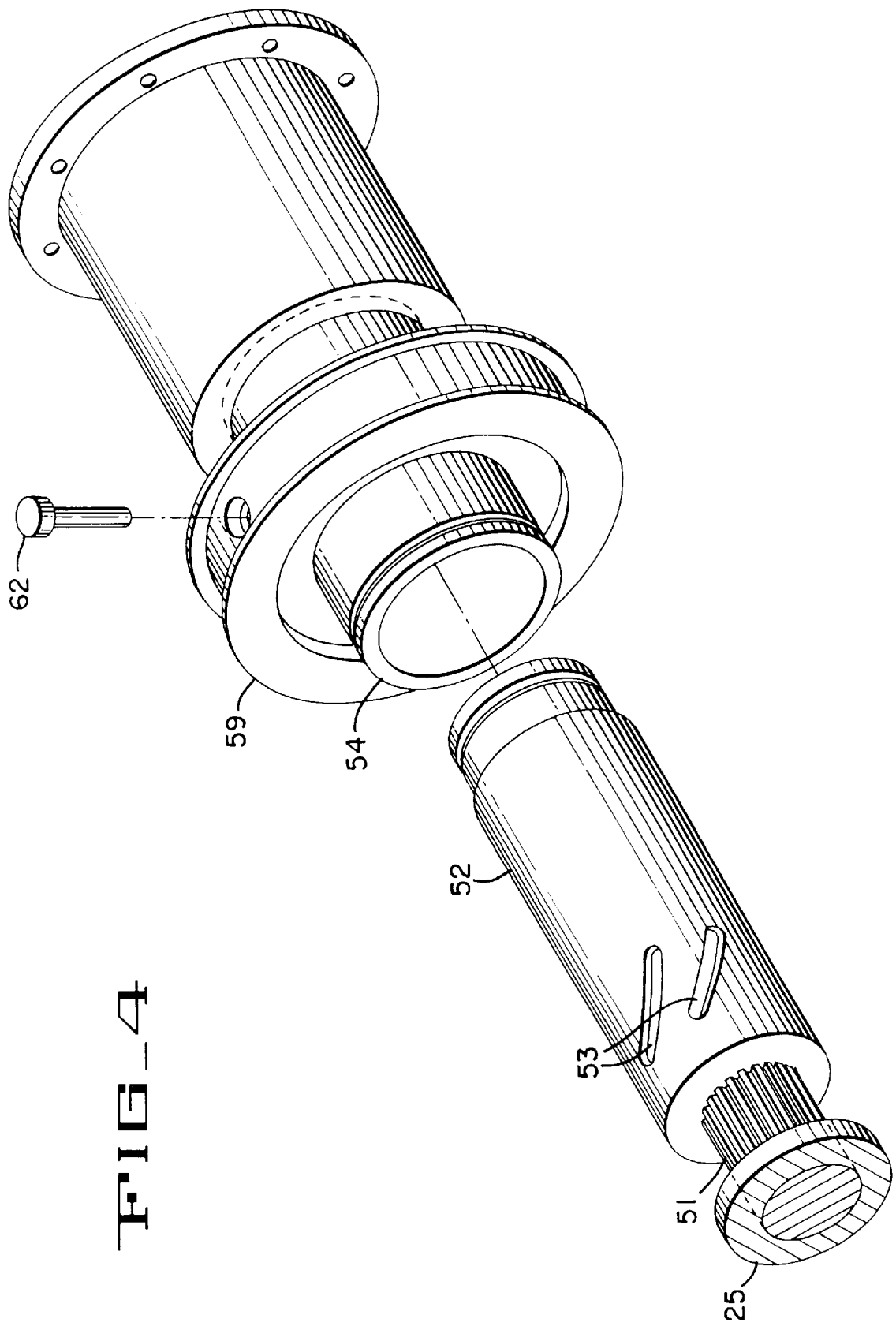

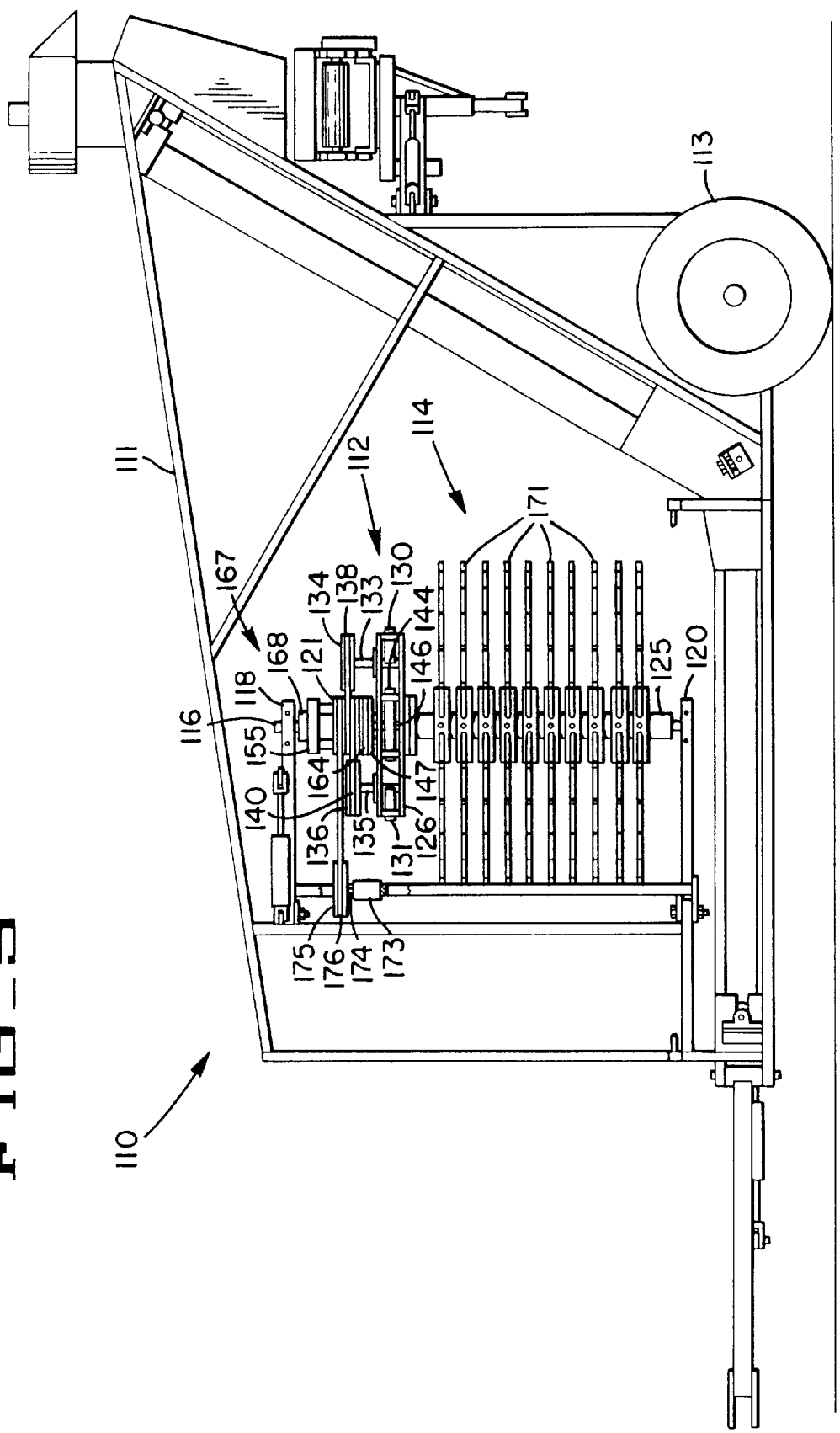

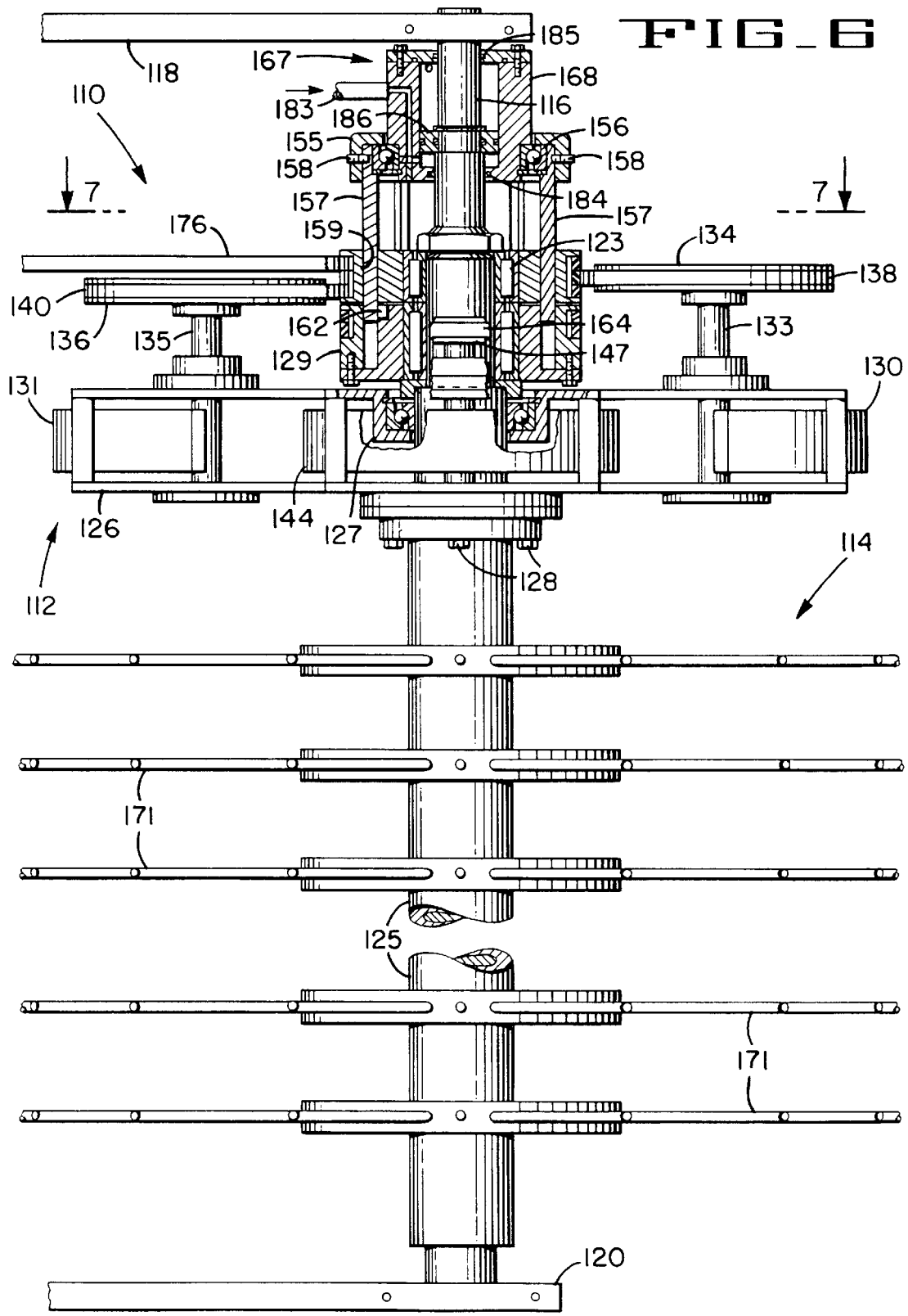
FIG_6

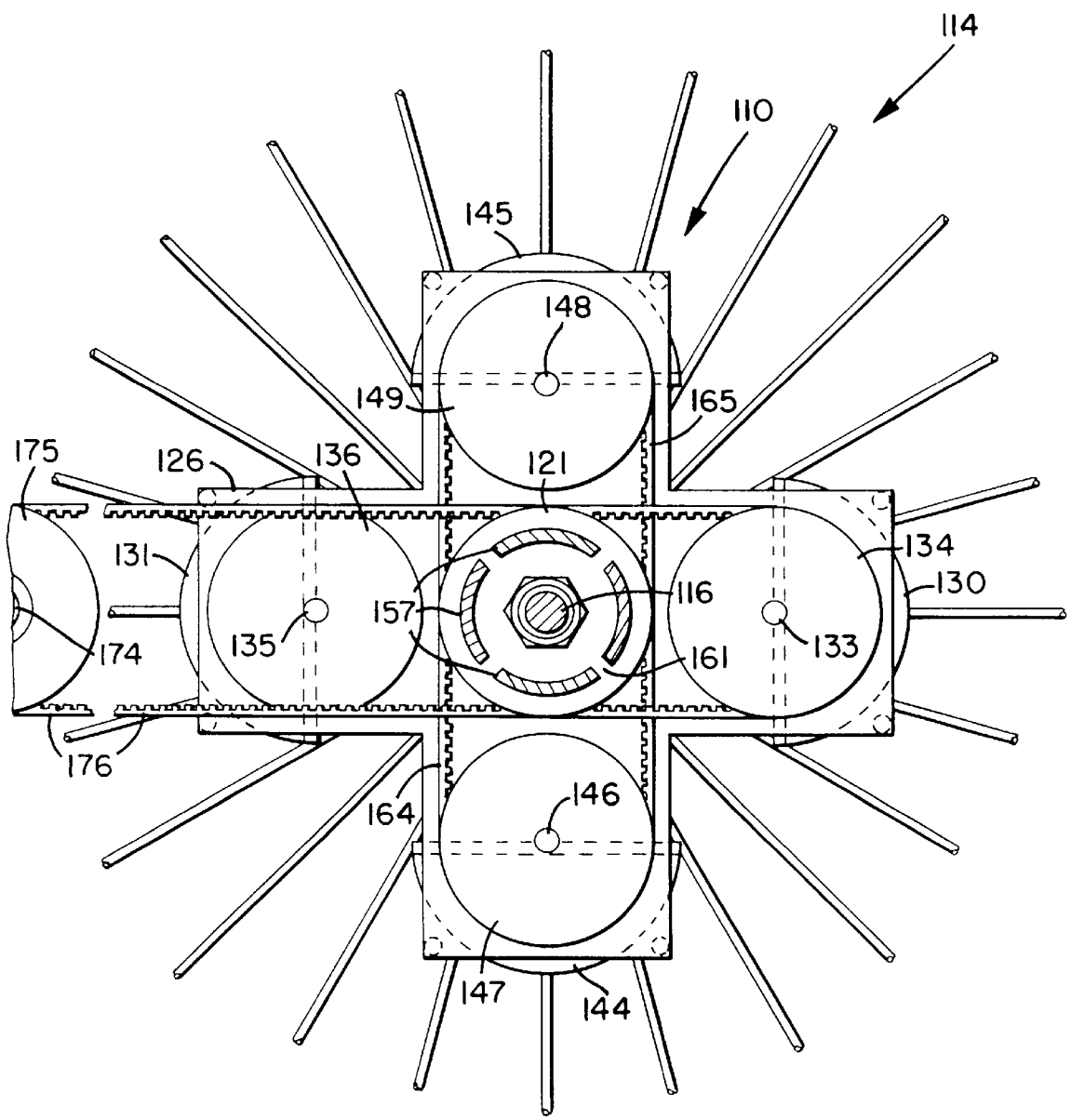
FIG_7

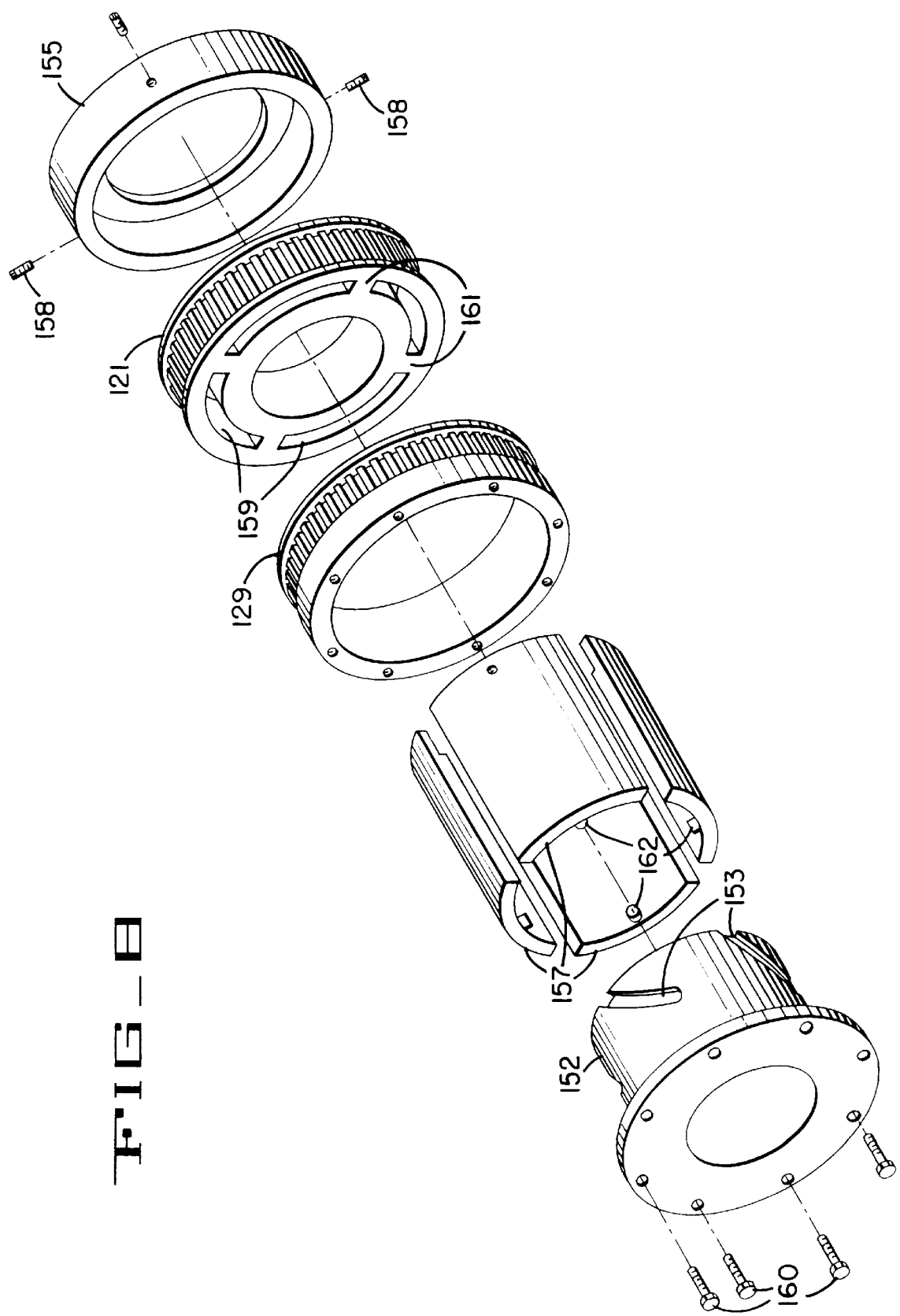
FIG_8

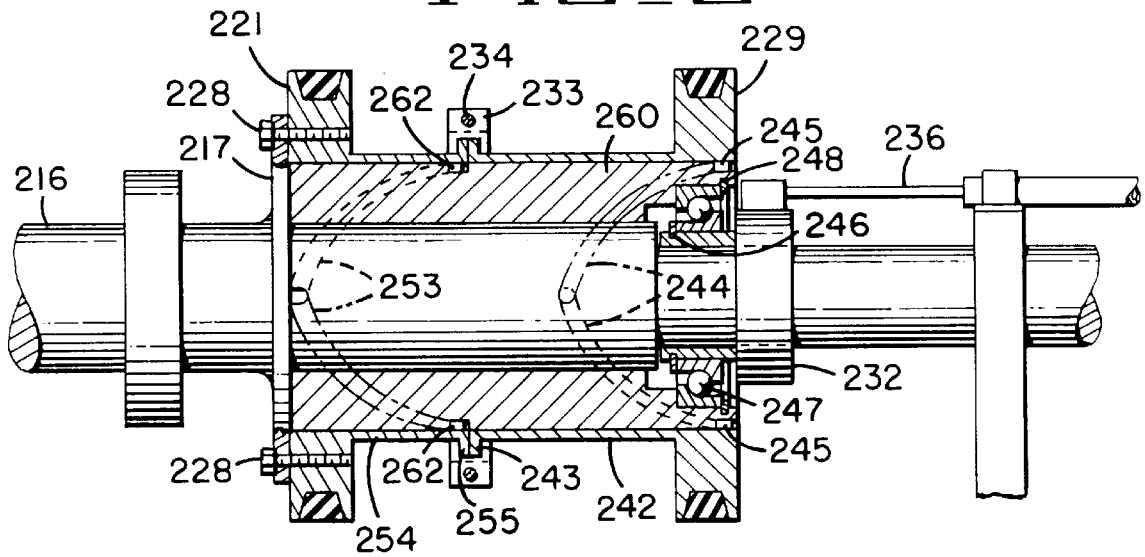
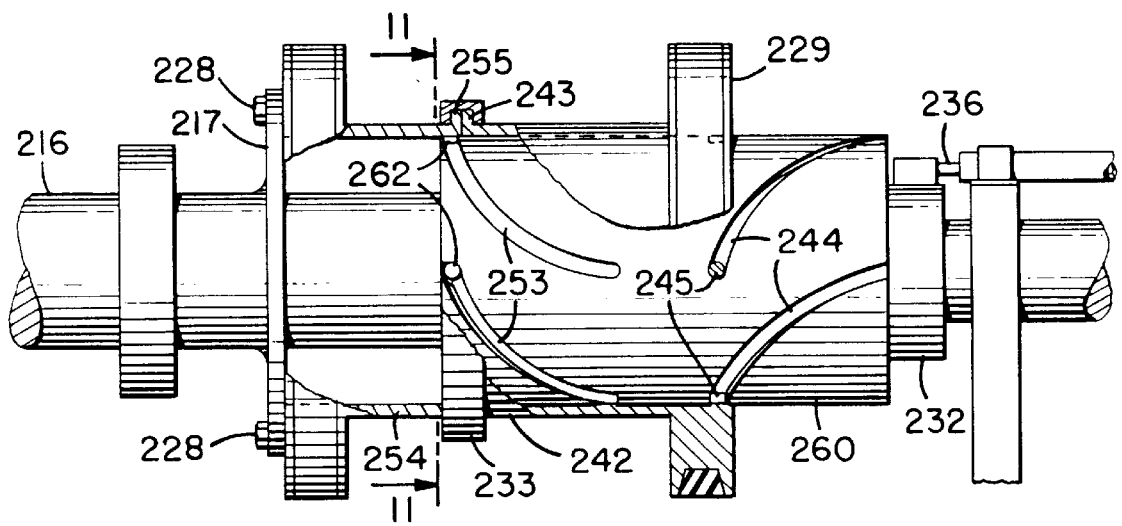
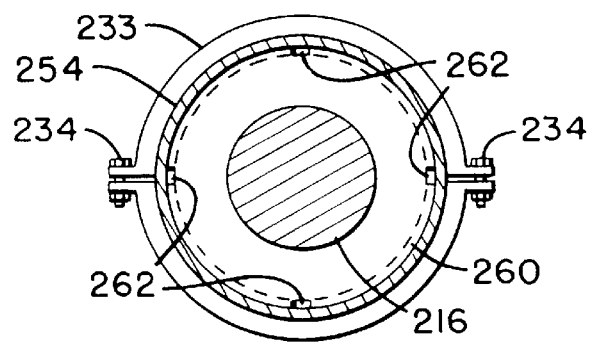

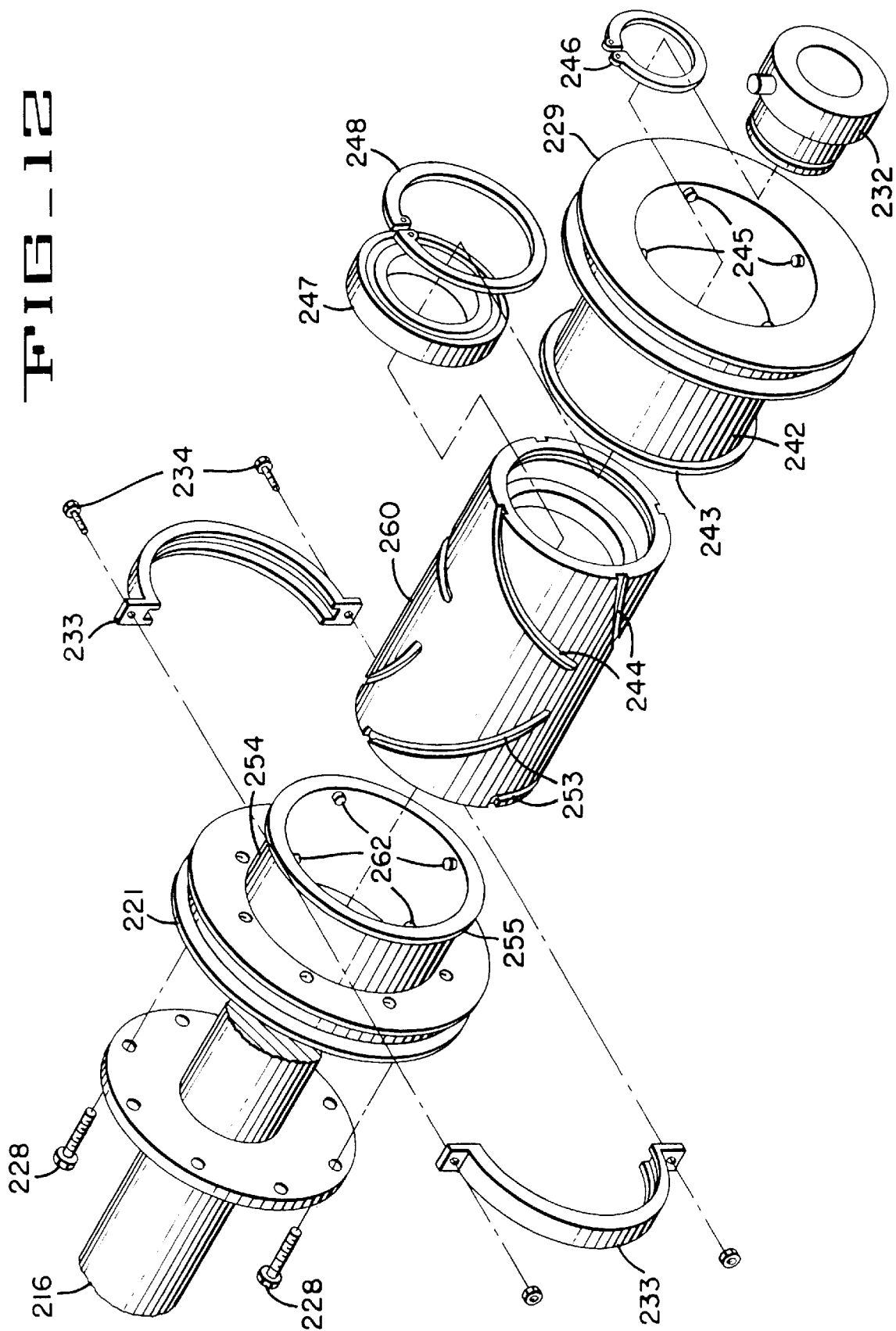
FIG_12

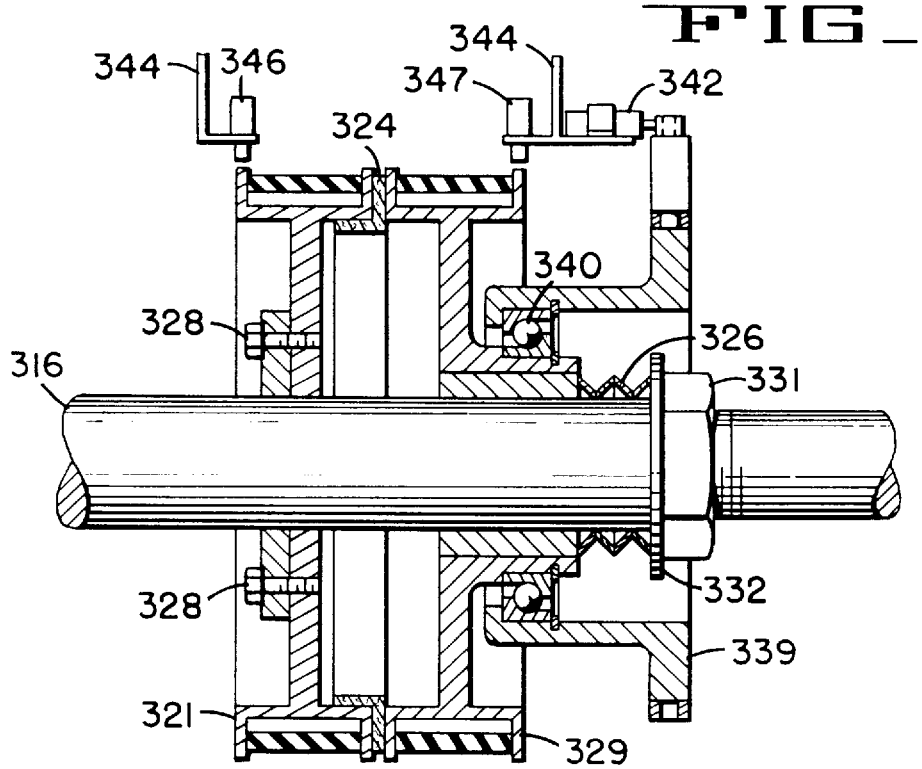
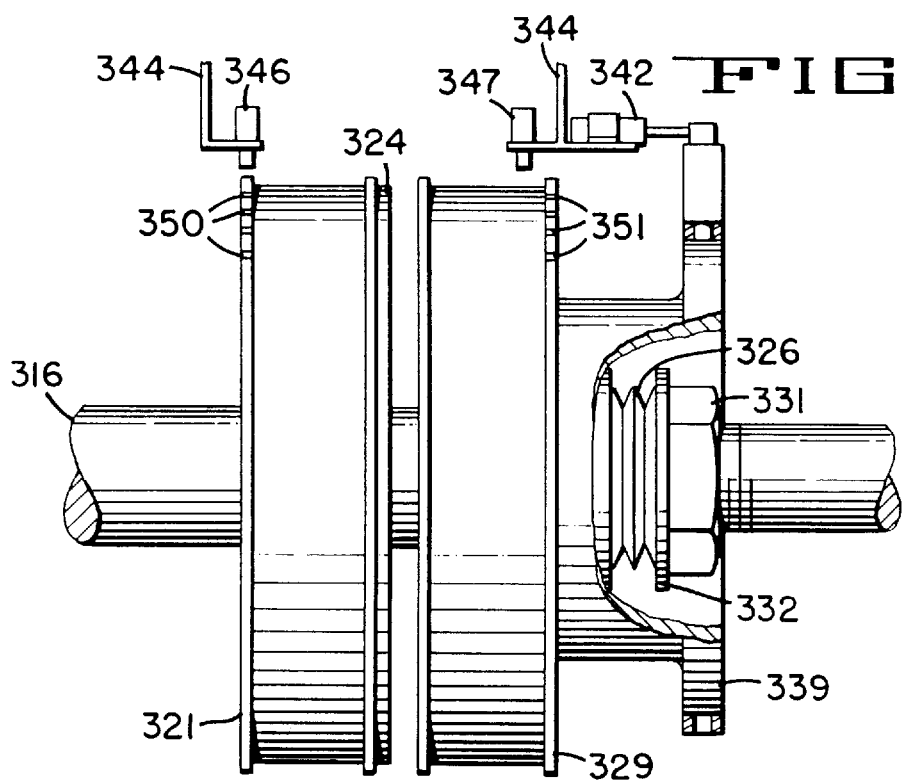

2

ADJUSTABLE FOUR-WEIGHT SHAKER HEAD

This application is a divisional of application Ser. No. 08/539,918, filed Oct. 6, 1995, now U.S. Pat. No. 5,685,773.

Forced balanced shakers are used in harvesters to provide an oscillation motion.

The present invention relates to a shaker head used in harvesters that uses four weights in an adjustable manner providing adjustable strokes.

FIG. 1 is a schematic view of a harvester which would use the inventive four weight shaker with a horizontal brush.

FIG. 2 is a cut away view of an embodiment of the inventive four weight shaker with a horizontal brush used in the harvester in FIG. 1.

FIG. 3 is a cut away view of the embodiment of the inventive shaker and part of the horizontal brush shown in FIG. 2.

FIG. 4 is an exploded view of part of the embodiment of the inventive shaker shown in FIG. 2.

FIG. 5 is a view of another harvester with another embodiment of the inventive four weight shaker with a vertical brush.

FIG. 6 is a cut away view of an embodiment of the inventive four weight shaker with a vertical brush used in the harvester in FIG. 5.

FIG. 7 is a cross sectional view of the embodiment of the inventive shaker shown in FIG. 6, along lines 7—7.

FIG. 8 is an exploded view of part of the embodiment of the inventive shaker shown in FIG. 6.

FIG. 9 is a cross sectional view of the pulleys of another embodiment of the invention.

FIG. 10 is cut away and cross-sectional view of the pulleys of the embodiment in FIG. 9, in a shifted position.

FIG. 11 is a cross-sectional view of FIG. 10 along lines 11.

FIG. 12 is an exploded view of the embodiment in FIG. 9.

FIG. 13 is a cross sectional view of pulleys and a phasing means of another embodiment of the invention.

FIG. 14 is a cut away view of the embodiment shown if FIG. 13.

DESCRIPTION OF THE PREFERRED EMBODIMENT

In the harvester 10 schematically shown in FIG. 1, a shaker mechanism 12 drives a horizontal brush 14. In this embodiment, the shaker mechanism 12 provides a rotation motion and an angular oscillation to the brush 14. One example of a harvester that uses a horizontal brush is described in U.S. Pat. No. 5,197,269 incorporated by reference.

FIG. 2 is a cut away view of an embodiment of the inventive four weight shaker with a horizontal brush used in the harvester in FIG. 1. FIG. 3 is a cut away view of the embodiment of the inventive shaker and part of the horizontal brush shown in FIG. 2. A shaft 16 is journaled between a first end mount 18 at a first end of the shaft 16 and a second end mount 20 at a second end of the shaft 16. A first drive pulley 21 is mounted around the shaft 16 and is keyed to the shaft 16, so that the shaft 16 rotates with the first drive pulley 21. A first shaft pulley 22 surrounds the shaft 16 and is also keyed to the shaft 16 so that it rotates with the shaft 16. An outer tube 25 surrounds the shaft 16 and slides freely around the shaft 16 so that the outer tube 25 rotates independently of the rotation of the shaft 16.

A first shaker housing 26 is mounted around the shaft 16 between the first shaft pulley 22 and the outer tube 25. The first shaker housing 26 rotates independently of the shaft 16, and is bolted to the outer tube 25 by bolts 28 so that the first shaker housing 26 rotates with the outer tube 25. A second drive pulley 29 surrounds the shaft 16 and is connected to the first shaker housing 26 and the outer tube 25 so that the second drive pulley 29 rotates with the first shaker housing 26 and the outer tube 25. Within the first shaker housing 26 is a first eccentric weight 30 and a second eccentric weight 31. The first eccentric weight 30 is keyed to a first eccentric weight shaft 33 which is keyed to a first eccentric weight pulley 34. So that the first eccentric weight 30, the first eccentric weight shaft 33 and the first eccentric weight pulley 34 all rotate together. A first endless belt 38 surrounds the first shaft pulley 22 and the first eccentric weight pulley 34. The second eccentric weight 31 is keyed to a second eccentric weight shaft 35 which is keyed to a second eccentric weight pulley 36. So that the second eccentric weight 31, the second eccentric weight shaft 35 and the second eccentric weight pulley 36 all rotate together. A second endless belt 39 surrounds the first shaft pulley 22 and the second eccentric weight pulley 36.

A second shaker housing 41 is mounted around the shaft 16 on the side of the outer tube 25 closest to the second end of the shaft 16. The second shaker housing 41 rotates independently of the shaft 16, and is bolted to the outer tube 25 by bolts 42 so that the second shaker housing 41 rotates with the outer tube 25. Within the second shaker housing 41 is a third eccentric weight 44 and a fourth eccentric weight 45. The third eccentric weight 44 is keyed to a third eccentric weight shaft 46 which is keyed to a third eccentric weight pulley 47. So that the third eccentric weight 44, the third eccentric weight shaft 46 and the third eccentric weight pulley 47 all rotate together. The fourth eccentric weight 45 is keyed to a fourth eccentric weight shaft 48 which is keyed to a fourth eccentric weight pulley 49, so that the fourth eccentric weight 45, the fourth eccentric weight shaft 48 and the fourth eccentric weight pulley 49 all rotate together.

A straight spline 51, which is formed by a long gear is keyed to the shaft 16 near the second end of the shaft 16, so that the straight spline 51 rotates with the shaft 16. A sliding tube 52 surrounds the straight spline 51 and is shaped so that the sliding tube 52 rotates with the straight spline 51. The sliding tube 52 is able to slide along the shaft 16 with respect to the shaft 16 and the straight spline 51. The sliding tube 52 has spiral grooves 53 on the outside of the sliding tube 52. A pulley tube 54 surrounds the sliding tube 52 and rotates independently of the sliding tube, and does not move longitudinally along the shaft 16 when the sliding tube 52 moves longitudinally. A ring 55 is bolted to the second shaker housing 41 so that the ring 55 rotates with the second shaker housing 41. A pulley tube bearing 56 is placed between the ring 55 and the pulley tube 54. The pulley tube bearing 56 helps to keep the pulley tube 54 from sliding along the shaft 16. A second shaft pulley 59 is integrated with the pulley tube 54. A plurality of pegs 62 pass through the pulley tube 54 and second shaft pulley 59 with an end of the pegs 62 fitting into the spiral grooves 53. A third endless belt 64 surrounds the second shaft pulley 59 and the third eccentric weight pulley 47. A fourth endless belt 65 surrounds the second shaft pulley 59 and the fourth eccentric weight pulley 49.

A hydraulic cylinder 67 is mounted to the frame 11 of the harvester 10. The hydraulic cylinder 67 is mechanically connected to a hydraulic cylinder shaft 68. The hydraulic cylinder shaft 68 is mechanically connected to the second end mount 20. The second end mount 20 allows the shaft 16 to rotate with respect to the second end mount 20 and slide with respect to the second end mount 20. The second end mount 20 is connected to the sliding tube 52 by a sliding tube bearing 69. The sliding tube bearing 69 allows the sliding tube 54 to rotate with respect to the end mount 20, but allows the end mount 20 to push and pull the sliding tube 54 along the shaft 16. A phase controller 85 controls the hydraulic cylinder 67.

On the outside of the outer tube 25 are a plurality of tines 71 forming a brush 14. A first hydraulic motor 73 is keyed to a first hydraulic motor shaft 74, which is keyed to a first hydraulic motor pulley 75. A first endless motor belt 76 surrounds the first hydraulic motor pulley 75 and the first drive pulley 21. A second hydraulic motor 78 is keyed to a second hydraulic motor shaft 79, which is keyed to a second hydraulic motor pulley 80. A second endless motor belt 81 surrounds the second hydraulic motor pulley 80 and the second drive pulley 29.

In operation, the second hydraulic motor 78 drives the second hydraulic motor shaft 79, which drives the second hydraulic motor pulley 80. The second hydraulic motor pulley 80 drives the second endless motor belt 81, which drives the second drive pulley 29, and causing the second drive pulley 29 to rotate. The rotation of the second drive pulley 29, causes the rotation of the first shaker housing 26, the brush 14, and the second shaker housing 41.

The first hydraulic motor 73 drives the first hydraulic motor shaft 74, which drives the first hydraulic motor pulley 75. The first hydraulic motor pulley 75 drives the first endless motor belt 76, which drives the first drive pulley 21, and causing the first drive pulley 21 to rotate. The rotation of the first drive pulley 21 causes the rotation of the shaft 16, which causes the rotation of the first shaft pulley 22.

The first shaft pulley 22 drives the first endless belt 38 and the second endless belt 39. The first endless belt 38 drives the first eccentric weight pulley 34, which drives the first eccentric weight shaft 33, which rotates the first eccentric weight 30. The second endless belt 39 drives the second eccentric weight pulley 36, which drives the second eccentric weight shaft 35, which rotates the second eccentric weight 31.

The shaft 16 also drives the straight spline 51, which causes the sliding tube 52 to rotate. The spiral grooves 53 in the rotating sliding tube 52 push on the pegs 62, which causes the pulley tube 54 and second shaft pulley 59 to rotate. The second shaft pulley 59 drives the third endless belt 64 and the fourth endless belt 65. The third endless belt 64 drives the third eccentric weight pulley 47, which drives the third eccentric weight shaft 46, which rotates the third eccentric weight 44. The fourth endless belt 65 drives the fourth eccentric weight pulley 49, which drives the fourth eccentric weight shaft 48, which rotates the fourth eccentric weight 45.

The phase controller 85 is set to change the phase between the eccentric weights. The phase controller 85 causes the hydraulic cylinder 67 to move the hydraulic cylinder shaft 68 along the shaft 16, which moves the second end mount 20 along the shaft 16. The second end mount 20 supports the second end of the shaft 16 and does not cause the shaft 16 to move along the shaft 16, but causes the sliding tube 52 to move along the shaft 16. Since the sliding tube 52 moves along the shaft 16 and the pulley tube 54 does not move along the shaft 16, sliding tube 52 slides along the shaft 16 with respect to the pulley tube 54. The pegs 62 in the spiral grooves 53 cause the pulley tube 54 to rotate with respect to the sliding tube 52 as the sliding tube 52 is moved long the shaft.

Initially the first, second, third, and fourth eccentric weights 30, 31, 44, 45 are all in phase, meaning that the eccentric weights 30, 31, 44, 45 are all on the same side of their respective eccentric weight shafts 33, 35, 46, 48. As the sliding tube 52 is moved along the shaft 16 by the hydraulic cylinder 67, the second shaft pulley 59 is rotated with respect to the shaft 16 and the first shaft pulley 22. This causes a phase change between the eccentric weights in the first shaker housing 26 and the weights in the second shaker housing 41. This allows an on the fly adjustment between the weights in the first shaker housing 26 and the second shaker housing 41, allowing for an on the fly adjustment of oscillation amplitude or variable amplitude oscillation. The first and second eccentric weights 30,31 may be a set of primary weights and therefore heavier than the third and fourth eccentric weights 44,45, which would be a set of secondary weights.

In this embodiment, the rotation of the brush 14 caused by the second hydraulic motor, causes plants to be moved with the brush 14. The angular oscillation of the brush 14 by the first hydraulic motor 73 causes fruit to be shaken from the plants. Some plants may be tomato plants or cucumber plants. The fruit would be tomatoes and cucumbers.

In this embodiment the shaker 12 and brush 14 are mounted on a frame 11 of the harvester 10 which is self propelled. Four wheels 13 are on the harvester 10.

In the specification and claims, a means for phasing is defined as a means for maintaining the set of primary eccentric weights and the set of secondary eccentric weights at the same angular speed with a phase difference between the primary eccentric weights and secondary eccentric weights, wherein the means for phasing is able to change the phase difference between the primary eccentric weights and the secondary eccentric weights while the primary eccentric weights and secondary eccentric weights are rotating. Changing the phase difference between the primary eccentric weights and the secondary eccentric weights means changing the relative angular position between the primary eccentric weights and the secondary eccentric weights. In this embodiment, a means for phasing, comprises the shaft 16, the straight spline 51, the sliding tube 52 with spiral grooves 53, the pulley tube 54, pegs 62, the hydraulic cylinder 67, and the hydraulic cylinder shaft 68. The means for phasing is mechanically connected between the first shaft pulley 22 and the second shaft pulley 59, and provides a means for keeping the first shaft pulley 22 and second shaft pulley 59 at relative angular speeds so that the set of primary eccentric weights and the set of secondary eccentric weights are rotated at the same angular speed. The pegs 62 act as followers in the spiral grooves 53, with the hydraulic cylinder 67 being a powered pusher means for pushing the pegs 62 along the spiral grooves 53.

FIG. 5 shows another harvester 110 with a another embodiment of the invention, using a vertical brush 114. In the harvester 110 schematically shown in FIG. 5, a shaker mechanism 112 drives a vertical brush 114. In this embodiment, the shaker mechanism 112 provides an angular oscillation to the brush 114. One example of a harvester that uses a vertical brush is described in U.S. Pat. No. 4,329,836 incorporated by reference.

FIG. 6 is a cut away view of an embodiment of the inventive four weight shaker with a vertical brush 114 used in the harvester in FIG. 5. FIG. 7 is a cross sectional view of the embodiment of the inventive shaker shown in FIG. 6, along lines 7—7. A shaft 116 is journaled between a first end mount 118 at a first end of the shaft 116 and a second end mount 120 at a second end of the shaft 116. A first shaft pulley 121 is mounted around the shaft 116 with a first shaft pulley bearing 123 allowing the first shaft pulley 121 to rotate independently of the shaft 116. An outer tube 125 surrounds the shaft 116 and slides freely around the shaft 116 so that the outer tube 125 rotates independently of the rotation of the shaft 116.

A shaker housing 126 is mounted around the shaft 116 between the first pulley 121 and the outer tube 125. The shaker housing 126 is mounted around a shaker housing bearing 127 so that the shaker housing 126 rotates independently of the shaft 116, and is bolted to the outer tube 125 by bolts 128 so that the shaker housing 126 rotates with the outer tube 125. A second shaft pulley 129 surrounds the shaft 116 between the first shaft pulley 121 and the shaker housing 126. A second shaft pulley bearing 132 is placed between the second shaft pulley 129 and the shaft 116 to allow the second shaft pulley 129 to rotate independently of the shaft 116. Within the shaker housing 126 is a first eccentric weight 130, a second eccentric weight 131, a third eccentric weight 144, and a fourth eccentric weight 145. The first eccentric weight 130 is keyed to a first eccentric weight shaft 133 which is keyed to a first eccentric weight pulley 134. So that the first eccentric weight 130, the first eccentric weight shaft 133 and the first eccentric weight pulley 134 all rotate together. A first endless belt 138 surrounds the first shaft pulley 121 and the first eccentric weight pulley 134. The second eccentric weight 131 is keyed to a second eccentric weight shaft 135 which is keyed to a second eccentric weight pulley 136. So that the second eccentric weight 131, the second eccentric weight shaft 135 and the second eccentric weight pulley 136 all rotate together. A second endless belt 140 surrounds the first shaft pulley 121 and the second eccentric weight pulley 136. The third eccentric weight 144 is keyed to a third eccentric weight shaft 146 which is keyed to a third eccentric weight pulley 147. So that the third eccentric weight 144, the third eccentric weight shaft 146 and the third eccentric weight pulley 147 all rotate together. The fourth eccentric weight 145 is keyed to a fourth eccentric weight shaft 148 which is keyed to a fourth eccentric weight pulley 149. So that the fourth eccentric weight 145, the fourth eccentric weight shaft 148 and the fourth eccentric weight pulley 149 all rotate together. A third endless belt 164 surrounds the second shaft pulley 129 and the third eccentric weight pulley 147. A fourth endless belt 165 surrounds the second shaft pulley 129 and the fourth eccentric weight pulley 149.

A hydraulic cylinder 167 is mounted around the shaft 116 between the first shaft pulley 121 and the first end mount 118. The hydraulic cylinder 167 has a hydraulic fluid entry and exit tube 183. The hydraulic cylinder 167 comprises an outer covering 168, which has a first fluid seal 184 and a second fluid seal 185 against the shaft 116 to prevent fluid from leaking around the shaft 116, and yet allows the outer covering 168 to slide along the shaft 116. Within the outer cover 168 is a cylinder piston 186, which is in fluid tight connection with both the outer covering 168 and the shaft 116, but which is able to slide with respect to the outer covering 168. The cylinder piston 186 is secured to the shaft 116, so that the piston 186 does not slide along the shaft 116. A ring 155 is mounted around the outer covering 168 by a ring bearing 156, which allows the ring 155 to rotate independently of the outer covering 168, and yet causes the ring 155 to slide along the shaft 116 with the outer covering 168.

Four curved plates 157, which form sections of a single cylinder have first ends of the curved plates 157 fitting into the ring 155 and held to the ring 155 by screws 158. The curved plates 157 pass through slots 159 in the first shaft pulley 121, and through a central hole in the second shaft pulley 129. Walls 161 separate the slots 159 in the first shaft pulley 121 A grooved tube 152 surrounds the second shaft pulley bearing 132 and is bolted to the second shaft pulley 129 by grooved tube bolts 160, so that the grooved tube 152 rotates with the second shaft pulley 129 and independently of the shaft 16. Four spiral grooves 153 are cut in the grooved tube 152. Pegs 162 at second ends of the curved plates 157 fit into the spiral grooves 153 of the grooved tube 152. In this embodiment, more than one peg 162 could be placed on each curved plate 157, also requiring more spiral grooves 153. Only one peg 162 is shown per curved plate 157 to simplify the illustration.

On the outside of the outer tube 125 are a plurality of tines 171 forming a brush 114. A hydraulic motor 173 is keyed to a hydraulic motor shaft 174, which is keyed to a hydraulic motor pulley 175. An endless motor belt 176 surrounds the hydraulic motor pulley 175 and the first shaft pulley 121.

The first and second eccentric weights 130, 131 form a set of primary eccentric weights. The third and fourth eccentric weights 144, 145 form a set of eccentric weights.

In operation, the hydraulic motor 173 drives the hydraulic motor shaft 174, which drives the hydraulic motor pulley 175. The hydraulic motor pulley 175 drives the endless motor belt 176, which drives the first shaft pulley 121, and causing the first shaft pulley 121 to rotate. The rotation of the first shaft pulley 121 drives the first endless belt 138 and the second endless belt 140. The first endless belt 138 drives the first eccentric weight pulley 134, which drives the first eccentric weight shaft 133, which rotates the first eccentric weight 130. The second endless belt 140 drives the second eccentric weight pulley 136, which drives the second eccentric weight shaft 135, which rotates the second eccentric weight 131.

The first shaft pulley 121 also drives the curved plates 157, which pass through the slots 159 in the first shaft pulley 121, with the walls 161 pushing against the curved plates 157. The pegs 162 on the second end of the curved plates 157 push against the sides of the spiral grooves 153 causing the grooved tube 152 to rotate. The rotation of the grooved tube 152 causes the second shaft pulley 129 to rotate The second shaft pulley 129 drives the third endless belt 164 and the fourth endless belt 165. The third endless belt 164 drives the third eccentric weight pulley 147, which drives the third eccentric weight shaft 146, which rotates the third eccentric weight 144. The fourth endless belt 165 drives the fourth eccentric weight pulley 149, which drives the fourth eccentric weight shaft 148, which rotates the fourth eccentric weight 145.

The hydraulic cylinder 167 moves the outer covering 168 along the shaft 116, which moves the ring 155 along the shaft 116. The movement of the ring 155 along the shaft 116 causes movement of the curved plates 157 along the shaft 116. Since the curved plates 157 moves along the shaft 116 and the grooved tube 152 does not move along the shaft 116, the pegs 162 in the spiral grooves 153 cause the curved plates 157 to rotate with respect to the grooved tube 152 as the curved plates 157 are moved along the shaft 116. Since the grooved tube 152 is secured to the second shaft pulley 129 and the curved plates 157 are driven by the first shaft pulley 121, a phase rotation between the grooved tube 152 and the curved plates 157 causes a phase rotation between the first shaft pulley 121 and the second shaft pulley 129.

Initially the first, second, third, and fourth eccentric weights 130, 131, 144, 145 are all in phase, meaning that the eccentric weights 130, 131, 144, 145 are all on the same side of their respective eccentric weight shafts 133, 135, 146, 148. As the curved plates 157 are moved along the shaft 116 by the outer covering 168, the second shaft pulley 129 is rotated with respect to the first shaft pulley 121. This causes a phase change between the set of primary eccentric weights 130, 131 and the set of secondary eccentric weights 144, 145. This allows an on the fly adjustment between the set of primary eccentric weights 130, 131 and the set of secondary eccentric weights 144, 145, allowing for an on the fly adjustment of oscillation amplitude or variable amplitude oscillation.

In this embodiment, the brush 114 may be placed against plants such as fruit trees, nut trees or grape vines. The angular oscillation of the tines 117 causes the fruit of the plants such as grapes or nuts to be removed from the plants.

In this embodiment the shaker 112 and brush 114 are mounted on a frame 111 of a pull behind harvester 110. The harvester 110 is mounted on two wheels 113, and the hydraulic power is provided by a tractor that pulls the harvester 110.

In this embodiment, a means for phasing, comprises the grooved tube 152 with spiral grooves 153, the ring 155, curved plates 157 with pegs 162, the hydraulic cylinder 167, slots 159, grooved tube bolts 160 and the outer covering 168. The means for phasing is mechanically connected between the first shaft pulley 121 and the second shaft pulley 129, and provides a means for keeping the first shaft pulley 121 and second shaft pulley 129 at relative angular speeds so that the set of primary eccentric weights and the set of secondary eccentric weights are rotated at the same angular speed and allows a change in the phase of rotation (relative angular position) between the set of primary eccentric weights and the set of secondary eccentric weights while the weights are rotating.

FIGS. 9–12 illustrate the pulleys and means for phasing in another embodiment of the invention. A shaft 216 with a flange 217 is mechanically connected to a first shaft pulley 221 by bolts 228. The first shaft pulley 221 is integrally formed with a first pulley tube 254, which has the first shaft pulley 254 on one end and a first pulley tube flange 255 on the other end. A grooved tube 260 passes through the center of the first pulley tube 254. Adjacent to the first pulley tube 254 the grooved tube 260 has a first plurality of spiral grooves 253, which spiral in a clockwise direction. A plurality of first pulley tube pegs 262 extend from the first pulley tube 254 into the first plurality of spiral grooves 253. A second pulley tube 242 has a second shaft pulley 229 at one end and a second pulley tube flange 243 at the other end. The grooved tube 260 passes through the center of the second pulley tube 242. Adjacent to the second pulley tube 242, the grooved tube 260 has a second plurality of spiral grooves 244, which spiral in a counter clockwise direction. A plurality of second pulley tube pegs 245 extend from the second pulley tube 242 into the second plurality of spiral grooves 244. The shaft 216 passes through the center of the grooved tube 260. A collar 232 also slips around the shaft on the side of the first pulley tube 254 and second pulley tube 242 away from the flange 217. An inner snap ring 246, a bearing 247 and outer snap ring 248 are used to connect the collar 232 to the grooved tube 260 allowing the grooved tube 260 to rotate independently of the collar 232. A flange clamp 233 secured by clamp bolts 234 surrounds the first pulley tube flange 255 and the second pulley tube flange 243, keeping the first pulley tube flange 255 adjacent to the second pulley tube flange 243, but allowing them to rotate independently. A push and pull rod 236 is attached to the collar 232 and is able to move the collar 232 along the shaft 216.

In operation, the push rod 236 may be fully extended as shown in FIG. 9, when the shaft 216 is driven. The first pulley tube pegs 262 and the second pulley tube pegs 245 are to the right part of the first spiral grooves 253 and the second spiral grooves 244 as viewed in FIG. 9. The shaft 216 drives the first shaft pulley 221 through the flange 217. The first shaft pulley 221 drives the first pulley tube 254, which drives the plurality of first pulley tube pegs 262, which drives the grooved tube 260, by pushing on the first plurality of spiral grooves 253. The second plurality of spiral grooves drives the second pulley tube pegs 245, which drive the second pulley tube 242, which drives the second shaft pulley 229.

The push and pull rod 236 then retracts, pulling the collar 232 to the right as viewed in FIG. 10. The movement of the collar 232 to the right along the shaft 216, causes the grooved tube 260 to move to the right along the shaft 216, while the first pulley tube 254 and the second pulley tube 242 do not move along the shaft 216. This relative movement between the grooved tube 260 and the first pulley tube 254 and the second pulley tube 242 causes the first pulley tube pegs 262 and the second pulley tube pegs 245 to move to the left part of the first spiral grooves 253 and the second spiral grooves 244 as shown in FIG. 10. The movement of the first pulley tube pegs 262 from the right side of the first spiral grooves 253 to the left side of the first spiral grooves 253 causes the first pulley tube 254 to move clockwise with respect to the grooved tube 260. The movement of the second pulley tube pegs 245 from the right side of the second spiral grooves 244 to the left side of the second spiral grooves 244 causes the second pulley tube 242 to move counter-clockwise with respect to the grooved tube 260. Since the first pulley tube 254 moves in the opposite direction as the second pulley tube 242 as the grooved tube 260 is moved to the right, causes a change in the relative angular position of the first pulley tube 254 and the second pulley tube 242, which causes a change in the relative angular position of the first shaft pulley 221 and the second shaft pulley 229.

In this embodiment, a means for phasing, comprises the grooved tube 260 with first spiral grooves 253 and second spiral grooves 244, the collar 232, the push and pull rod 236, the first pulley tube pegs 262, and the second pulley tube pegs 245. The means for phasing is mechanically connected between the first shaft pulley 221 and the second shaft pulley 229. The means for phasing in this embodiment may replace the means for phasing, the first shaft pulley, the second shaft pulley and the shaft in the embodiment shown in FIGS. 5 to 8.

FIGS. 13 and 14 illustrate the pulleys and means for phasing in another embodiment of the invention. FIGS. 13 and 14 show a first shaft pulley 321 and a second shaft pulley 329 mounted on a shaft 316. The first shaft pulley 321 is bolted to the shaft 316 by bolts 328, so that the first shaft pulley 321 rotates with the shaft 316. A clutch face 324 is mechanically connected to a side of the first shaft pulley 321 between the first shaft pulley 321 and the second shaft pulley 329, so that the clutch face 324 rotates with the first shaft pulley 321. The second shaft pulley 329 is able to rotate independently of the shaft 316. A nut 331 and collar 332 are placed on the shaft 316. Belville washer springs 326 are placed between the collar 332 and the second shaft pulley 329 to apply a force on the second shaft pulley 329 towards the clutch face 324. A throw out piece 339 is connected to the second shaft pulley 329 by a bearing 340 so that the throw out piece 339 rotates independently of the second shaft pulley 329. A hydraulic cylinder 342 is connected between the throw out piece 339 and the frame 344 of the harvester. A first sensor 346 is placed adjacent to the first shaft pulley 321 and mounted on the frame 344 so that the first sensor 346 senses markings 350 on the first shaft pulley 321. A second sensor 347 is placed adjacent to the second shaft pulley 329 and mounted on the frame 344 so that the second sensor 347 senses markings 351 on the second shaft pulley 329. The first sensor 346 and the second sensor 347 are electrically connected to a phase controller 85. The hydraulic cylinder 342 is in fluid connection with the phase controller 85.

In operation, the phase controller 85 is set for a desired phase relationship between the first shaft pulley 321 and the second shaft pulley 329. The first sensor 346 senses the markings on the first shaft pulley 321. The second sensor 347 senses the markings on the second shaft pulley 329. The phase controller 85 uses the sensed markings to determines the actual phase relationship between the first shaft pulley 321 and the second shaft pulley 329. If the desired phase relationship is not equal to the actual phase relationship, the phase controller 85 actuates the hydraulic cylinder 342, which pushes the throw out piece 339 away from the first shaft pulley 321. The throw out piece 339 pulls the second shaft pulley 329 from the first shaft pulley 321, the first shaft pulley 321 to rotate faster than the second shaft pulley 329, allowing a change in the actual phase relationship between the first shaft pulley 321 and the second shaft pulley 329. The phase controller 85 then pulls the throw out piece 339 towards the first shaft pulley 321, which pushes the second shaft pulley 329 towards the first shaft pulley 321 pushing the second shaft pulley 329 against the clutch face 324. The matching surfaces of the clutch face 324 and the second shaft pulley 329 causes sufficient friction so that the second shaft pulley 329 spins as fast as the first shaft pulley 321, when the second shaft pulley 329 is against the clutch face. The phase controller 85 again senses the markings on the first shaft pulley 321 and the second shaft pulley 329 and measures the actual phase relationship. If the actual phase relationship is equal to the desired phase relationship, the process is stopped. If the actual phase relationship is not equal to the desired phase relationship, the above process is again repeated until the actual phase relationship is equal to the desired phase relationship.

Others embodiments of the invention may have different numbers of weights in the sets of primary and secondary weights. Hydraulic motors may be replaced by other power means. The rotating brush may be replaced by a clamp for tree shaking. The brush may also be replaced by a U-shaped frame to provide a grape harvester which shakes the stumps of a grape vine as described in U.S. Pat. No. 4,286,426 incorporated by reference.

Although the best mode contemplated for carrying out the present invention has been herein shown and described, it will be understood that modification and variation may be made without departing from what is regarded to be the subject matter of the invention.

What is claimed is:

1. An apparatus for providing angular oscillation, comprising:
   a set of primary eccentric weights;
   a set of secondary eccentric weights;
   a means for driving the set of primary eccentric weights in an angular direction, mechanically connected to the set of primary eccentric weights;
   a means for driving the set of secondary eccentric weights in an angular direction, mechanically connected to the set of secondary eccentric weights; and
   means for phasing, mechanically connected between the means for driving the set of primary eccentric weights and the means for driving the set of secondary eccentric weights;
   the means for phasing including means for maintaining the set of primary eccentric weights and the set of secondary eccentric weights at the same angular speed, with a phase difference therebetween, and mean for changing the phase difference between the primary eccentric weights and the secondary eccentric weights while both sets are in motion.

2. The apparatus, as recited in claim 1, further comprising, a phase controller connected to the means for phasing.

3. The apparatus, as recited in claim 2, wherein the set of primary eccentric weights, comprises:
   a first primary eccentric weight, that rotates around a first primary axis; and
   a second primary eccentric weight, that rotates around a second primary axis, spaced apart from the first primary axis, and wherein the set of secondary eccentric weights, comprises:
   a first secondary eccentric weight, that rotates around a first secondary axis; and
   a second secondary eccentric weight, that rotates around a second secondary axis, spaced apart from the first secondary axis.

4. The apparatus, as recited in claim 3, further comprising an axis of oscillation, wherein the first primary axis and the second primary axis are on opposite sides of the axis of oscillation, and wherein the first secondary axis and the second secondary axis are on opposite sides of the axis of oscillation.

5. An apparatus for harvesting fruits from plants, comprising:
   a frame;
   a plurality of wheels supporting said frame;
   a shaking mechanism for removing the fruits from the plant supported by said frame; and
   shaker for shaking the shaking mechanism, comprising:
   a set of primary eccentric weights;
   a set of secondary eccentric weights;
   a means for driving the set of primary eccentric weights in an angular direction, mechanically connected to the set of primary eccentric weights;
   a means for driving the set of secondary eccentric weights in an angular direction, mechanically connected to the set of secondary eccentric weights; and
   means for phasing, mechanically connected between the means for driving the set of primary eccentric weights and the means for driving the set of secondary eccentric weights;
   the means for phasing including means for maintaining the set of primary eccentric weights and the set of secondary eccentric weights at the same angular speed, with a phase difference therebetween, and means for changing the phase difference between the primary eccentric weights and the secondary eccentric weights while both sets are in motion.

6. The apparatus, as recited in claim 5, further comprising, a phase controller connected to the means for phasing.

7. The apparatus, as recited in claim 6, wherein the set of primary eccentric weights, comprises:
   a first primary eccentric weight, that rotates around a first primary axis; and
   a second primary eccentric weight, that rotates around a second primary axis, spaced apart from the first primary axis, and wherein the set of secondary eccentric weights, comprises:
  a first secondary eccentric weight, that rotates around a first secondary axis; and
  a second secondary eccentric weight, that rotates around a second secondary axis, spaced apart from the first secondary axis.

8. The apparatus, as recited in claim 7, further comprising an axis of oscillation about which the shaking mechanism oscillates, wherein the first primary axis and the second primary axis are on opposite sides of the axis of oscillation, and wherein the first secondary axis and the second secondary axis are on opposite sides of the axis of oscillation.

9. A harvester for harvesting fruits from plants, comprising:
  a frame;
  a plurality of wheels supporting the frame;
  a harvesting apparatus for removing fruits from plants;
  a shaker for shaking the harvesting apparatus, comprising:
    a set of primary eccentric weights;
    a set of secondary eccentric weights;
    a means for phasing, mechanically connected between the set of primary eccentric weights and secondary eccentric weights, wherein the means for phasing maintains the set of primary eccentric weights and the set of secondary eccentric weights at the same angular speed, with a phase difference between the primary eccentric weights and the secondary eccentric weights, and wherein the means for phasing includes means for changing the phase difference between the primary eccentric weights and the secondary eccentric weights while the primary eccentric weights and the secondary eccentric weights are rotating.

10. The harvester, as recited in claim 9, further comprising a phase controller connected to the means for phasing.

11. The apparatus, as recited in claim 10, wherein the set of primary eccentric weights, comprises:
  a first primary eccentric weight, that rotates around a first primary axis; and
  a second primary eccentric weight, that rotates around a second primary axis, spaced apart from the first primary axis, and wherein the set of secondary eccentric weights, comprises:
    a first secondary eccentric weight, that rotates around a first secondary axis; and
    a second secondary eccentric weight, that rotates around a second secondary axis, spaced apart from the first secondary axis.

12. The apparatus, as recited in claim 11, further comprising an axis of oscillation about which the harvesting apparatus oscillates, wherein the first primary axis and the second primary axis are on opposite sides of the axis of oscillation, and wherein the first secondary axis and the second secondary axis are on opposite sides of the axis of oscillation.

13. An apparatus, for harvesting fruits from plants, comprising:
  a set of primary eccentric weights;
  a set of secondary eccentric weights;
  means for rotating the set of primary eccentric weights at a first speed;
  means for rotating the set of secondary eccentric weights at the first speed, wherein the rotation of the set of primary eccentric weights and the set of secondary eccentric weights have a phase difference of a first phase difference;
  means for setting a control to change the phase difference from the first phase difference to a second phase difference; and
  means for changing the rotation of the set of secondary eccentric weights so that the phase difference between the rotation of the primary eccentric weights and the secondary eccentric weights is equal to the second phase difference, wherein the means for changing of the rotation of the secondary eccentric weights changes the rotation of the secondary eccentric weights while the set of primary eccentric weights and the set of secondary eccentric weight are rotating.

14. The apparatus, as recited in claim 13, further comprising:
  a frame;
  a plurality of wheels supporting the frame; and
  a harvesting mechanism for removing the fruits from the plants, supported by the frame and mechanically connected to the set of primary eccentric weights and the secondary eccentric weights.

15. The apparatus, as recited in claim 14, wherein the set of primary eccentric weights, comprises:
  a first primary eccentric weight, that rotates around a first primary axis; and
  a second primary eccentric weight, that rotates around a second primary axis, spaced apart from the first primary axis, and wherein the set of secondary eccentric weights, comprises:
    a first secondary eccentric weight, that rotates around a first secondary axis; and
    a second secondary eccentric weight, that rotates around a second secondary axis, spaced apart from the first secondary axis.

16. The apparatus, as recited in claim 15, further comprising an axis of oscillation about which the harvesting mechanism oscillates, wherein the first primary axis and the second primary axis are on opposite sides of the axis of oscillation, and wherein the first secondary axis and the second secondary axis are on opposite sides of the axis of oscillation.

17. An apparatus, for harvesting fruits from plants, comprising:
  a set of primary eccentric weights, wherein the set of primary eccentric weights, comprises:
    a first primary eccentric weight, that rotates around a first primary axis; and
    a second primary eccentric weight, that rotates around a second primary axis, spaced apart from the first primary axis;
  a set of secondary eccentric weights, wherein the set of secondary eccentric weights, comprises:
    a first secondary eccentric weight, that rotates around a first secondary axis; and
    a second secondary eccentric weight, that rotates around a second secondary axis, spaced apart from the first secondary axis;
  means for rotating the set of primary eccentric weights at a first speed;
  means for rotating the set of secondary eccentric weights at the first speed; and
  phasing means connected between the means for rotating the set of primary eccentric weights and the means for rotating the set of secondary eccentric weights;

the phasing means including means for maintaining the set of primary eccentric weights and the set of secondary eccentric weights at the first speed, with a phase difference therebetween, and means for changing the phase difference between the primary eccentric weights and the secondary eccentric weights while both sets are in motion.

18. The apparatus, as recited in claims 17, further comprising:

a frame;

a plurality of wheels supporting the frame; and a harvesting mechanism for removing the fruits from the plants, supported by the frame and mechanically connected to the set of primary eccentric weights and the secondary eccentric weights.

19. The apparatus, as recited in claim 18, further comprising an axis of oscillation about which the harvesting mechanism oscillates, wherein the first primary axis and the second primary axis are on opposite sides of the axis of oscillation, and wherein the first secondary axis and the second secondary axis are on opposite sides of the axis of oscillation.

* * * * *